United States Patent [19]

Matheny, III et al.

[11] Patent Number: 4,561,820

[45] Date of Patent: Dec. 31, 1985

[54] CAROUSEL AUTOMATIC STORAGE AND RETRIEVAL SYSTEM

[75] Inventors: William F. Matheny, III; Clay Bernard, II; William M. Angell, all of Tulsa, Okla.

[73] Assignee: SPS Technologies, Inc., Newtown, Pa.

[21] Appl. No.: 193,757

[22] Filed: Oct. 3, 1980

Related U.S. Application Data

[63] Continuation of Ser. No. 910,453, May 30, 1978, abandoned.

[51] Int. Cl.$^4$ .............................................. B65G 1/00
[52] U.S. Cl. ................................... 414/331; 414/662; 414/564; 198/809
[58] Field of Search ............... 414/267, 268, 269, 272, 414/277, 278, 280–282, 285, 286, 662–664, 667, 331, 564, 787; 198/809, 361, 371, 436, 448, 955

[56] References Cited

U.S. PATENT DOCUMENTS

| | | | |
|---|---|---|---|
| 1,528,893 | 3/1925 | Rother | 414/244 |
| 3,378,151 | 4/1968 | Salloum | 414/233 |
| 3,490,616 | 1/1970 | Castaldi | 414/282 X |
| 3,554,391 | 1/1971 | Goodell | 414/331 |
| 3,780,852 | 12/1973 | Weiss et al. | 414/331 X |
| 3,809,254 | 5/1974 | Pipes | 414/280 |

Primary Examiner—Duane A. Reger
Assistant Examiner—James E. Barlow
Attorney, Agent, or Firm—Aaron Nerenberg; William S. Dorman

[57] ABSTRACT

An article storage and retrieval system which includes a continuous track and a continuous article storage carousel supported from the track. The article storage carousel is movable in a horizontal direction and contains a plurality of horizontally spaced and vertically extending baskets. Each basket has vertically spaced compartments. A motor is included to drive the article storage carousel around the track. An elevator is mounted in a fixed position adjacent to the outside of the track and includes a vertically movable article engager for placement in or withdrawal from a preselected compartment.

15 Claims, 7 Drawing Figures

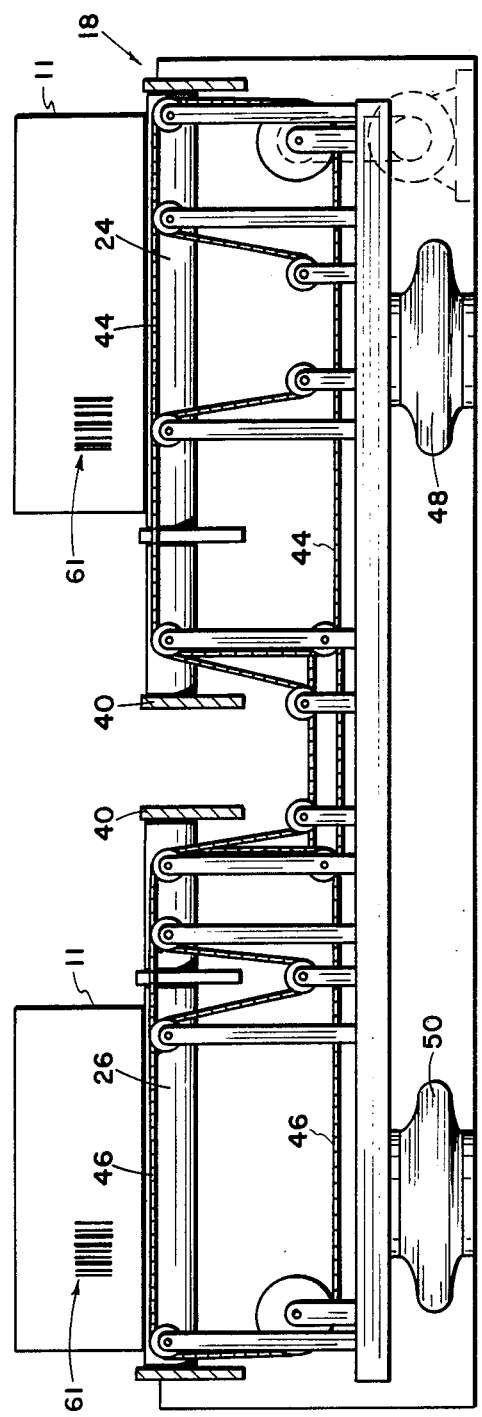
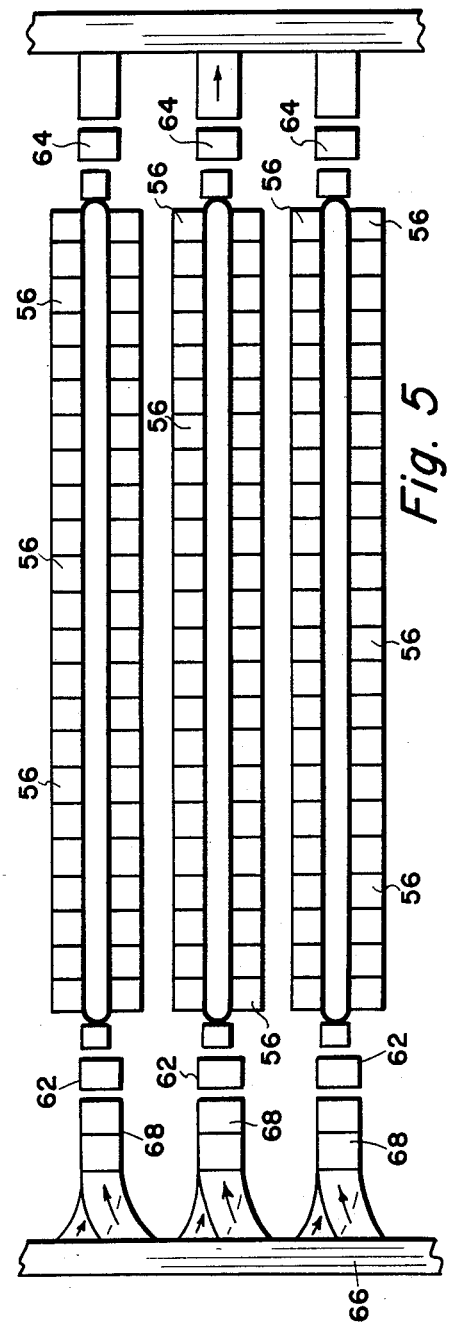
Fig. 4
Fig. 5

CAROUSEL AUTOMATIC STORAGE AND RETRIEVAL SYSTEM

This is a continuation of application Ser. No. 910,453, filed May 30, 1978, now abandoned.

BACKGROUND OF THE INVENTION

1. Field of the Invention

This invention relates to a storage and retrieval apparatus for small parts and the like. More particularly, this invention relates to a storage and retrieval apparatus for articles such as small parts and the like that is controlled from a remote station.

2. Description of the Prior Art

Systems of automatic storage and retrieval for inventory items to be used in warehouse applications are numerous. All storage and retrieval systems attempt to reduce the time taken in placing inventory items in storage and to reduce the time taken in retrieving the inventory items from storage when desired. Small parts frequently can not be palletized and often must be stored in bins or containers because of their size or their delicate construction.

Conventional storage and retrieval systems utilized solid storage shelves whereby an extractor or picking mechanism must go to the shelf to pick the desired inventory item. This limits the conventional system to essentially one transaction each time the extractor is operated.

Therefore, it is a principal object and purpose of the present invention to provide a system whereby the desired inventory items are brought to the extractor mechanism as opposed to having the solid shelves where the extractor mechanism must go the shelf. Combining a single extractor mechanism with a number of independently operating systems to bring the inventory items to the extractor will multiply the speed capabilities of the system.

It is a further object and purpose of the present invention to provide an automatic storage and retrieval system whereby a vacuum pump is utilized to insert containerized inventory items in storage or extract containerized inventory items from storage.

SUMMARY OF THE INVENTION

The present invention is designed to place in storage, store, and retrieve small parts and the like automatically upon command from a remote terminal.

A rigid, permanently mounted elevator includes a carriage or shuttle which moves vertically inside the supporting elevator and can accomodate two separate tote bins containing small parts simultaneously. Two sets of carriage roller shuttles are chain driven. Between the two shuttles, two smaller sets of free-floating rollers are aligned. Between the two sets of free rollers, two tracks contain a traveling arm. Vacuum pump suction rings are mounted on the traveling arm. A tote bin that is positioned on the free rollers can be moved onto either of the roller shuttles through use of sets of chain conveyors on the carriage located between the individual rollers.

The storage and retrieval system includes at least one carousel having a top track and a bottom track. The tracks would be identical, and continuous. The elevator is aligned adjacent to the carousel.

Each carousel includes a number of compartmented baskets that are parallel to each other and are moved along the tracks by an electrically or hydraulically operated motor.

The multi-faceted system is controlled from a remote digital keyboard operator's terminal. Normally, one tote bin would be taken from storage and another would be returned to storage during each vertical cycle of the carriage. The placement of tote bins in the compartment levels is randomly done through use of a remote laser scanner. The computer memory in the operator's terminal remembers where each tote bin is in the system and will retrieve the desired coded bin upon command.

BRIEF DESCRIPTION OF THE DRAWINGS

FIG. 4 is a sectional view of the carriage taken along section line 4—4 of FIG. 3;

FIG. 5 is a top plan view of a small parts storage and retrieval system constructed in accordance with an alternate embodiment of the present invention;

DETAILED DESCRIPTION OF THE PREFERRED EMBODIMENTS

Figure 2:
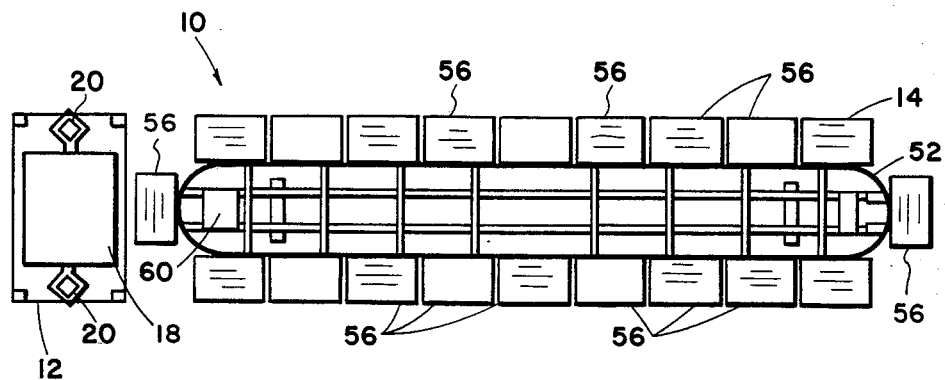
FIG. 2 is a top plan view of a small parts storage and retrieval system shown in FIG. 1.

Referring to the drawings in detail, FIGS. 1 through 4 show a system 10 of automatic storage and retrieval for small parts and the like with remote operation. The small parts could be stored in containers or tote bins 11. The system would be utilized for a multitude of different items, such as car parts, aircraft parts and computer parts and could be used in both retail and wholesale applications.

Figure 1:
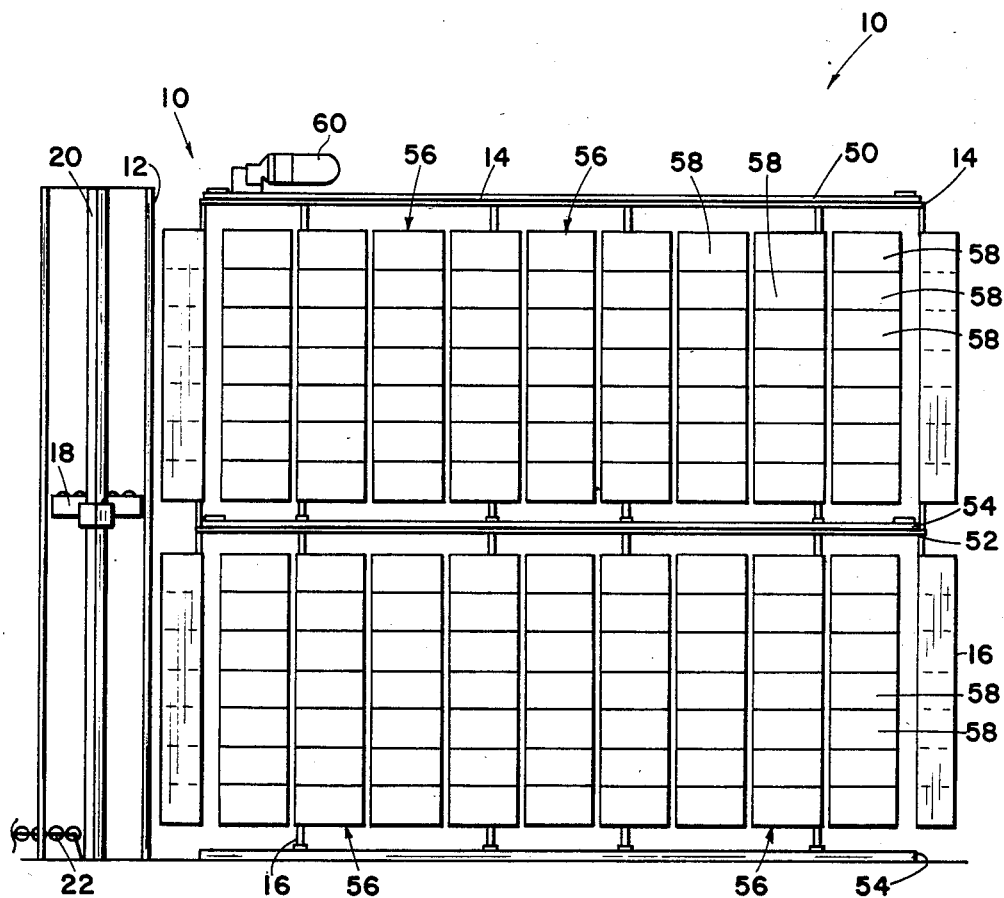
FIG. 1 is a side elevation of a small parts storage and retrieval system constructed in accordance with one embodiment of the present invention showing an elevator aligned adjacent to two carousels.

As best seen in FIG. 1, a rigid, permanently mounted elevator 12 is designed for use with small parts storage carousels 14 and 16. A carriage 18 moves vertically inside the supporting elevator 12 and can accomodate two separate containers or tote bins simultaneously. The carriage 18 includes sets of rollers aligned in a horizontal plane. Two vertical poles 20 support the carriage and the carriage is slidably attached thereto. The carriage is moved vertically by an electric motor and weights attached to chain (not shown) would be used as a counter-balance. The feeding of the carriage 18 would be from a waist-high work station or, alternatively, a conveyor 22.

Figure 3:
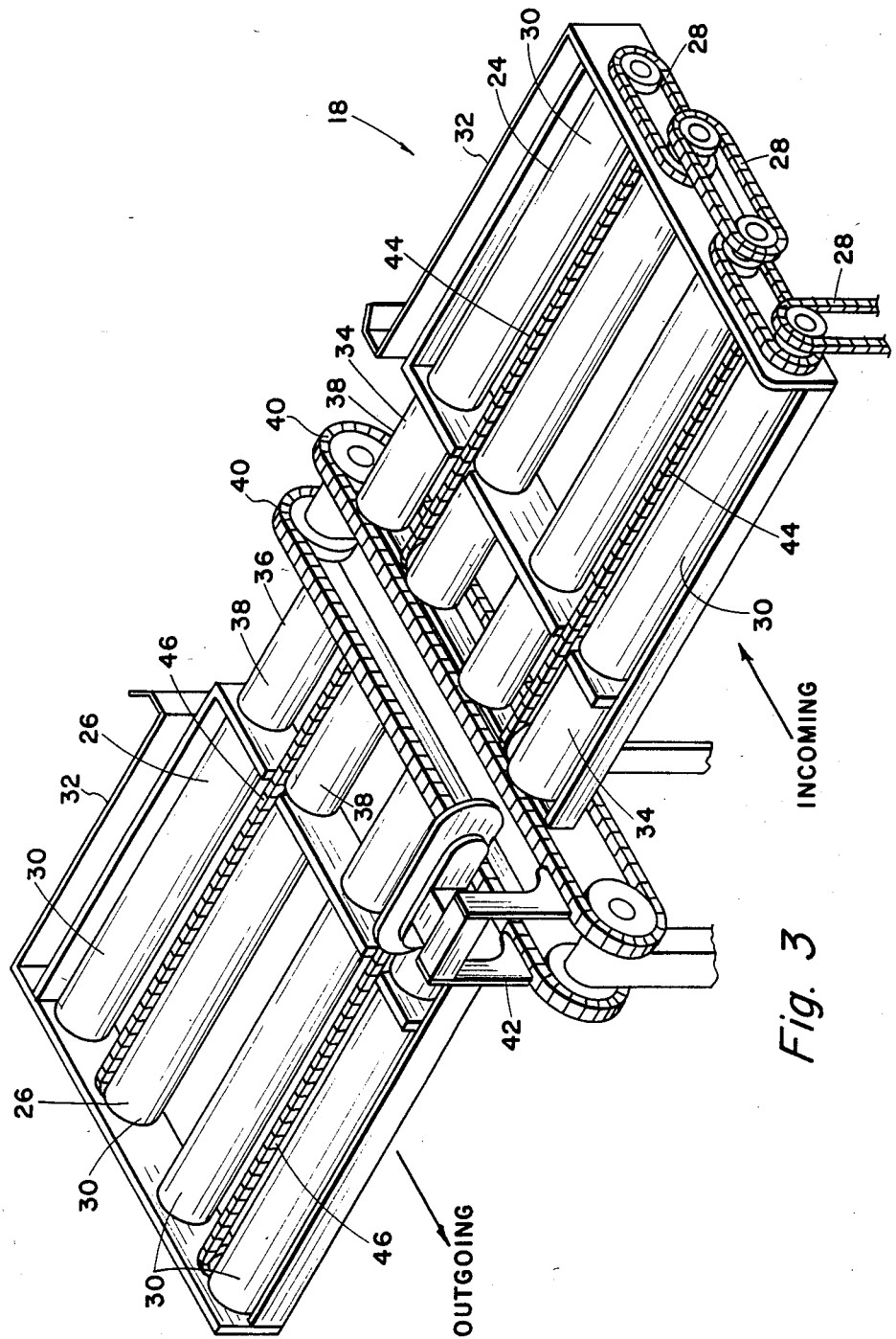
FIG. 3 is a perspective view of a carriage that would be within the elevator of the small parts storage and retrieval system shown in FIG. 1.

As best seen in FIG. 3, two sets of roller shuttles 24 and 26 are attached to a chain drive 28 and remotely operated. Each set of roller shuttles includes a plurality of individual rollers 30. These two sets of roller shuttles would be fed by the work station or the conveyor 22 located near the base of the elevator. In one application of the invention, one shuttle 24 would be used for incoming tote bins while the other shuttle 26 would be used for outgoing tote bins. Guardrails 32 may surround part of the shuttles 24 and 26. Between the two shuttles 24 and 26, two small sets of free rollers 34 and 36 are aligned in the same horizontal plane. Each set of free rollers includes a plurality of individual rollers 38.

Figure 6:
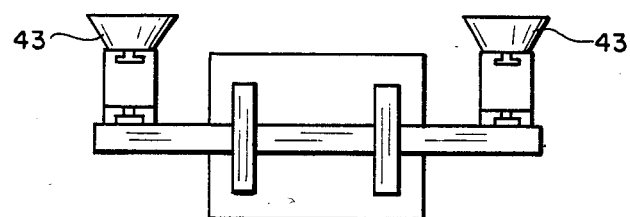
FIG. 6 is a top plan view of a modified traveling arm with suction rings attached that would be located on the carriage shown in FIG. 3.
Figure 7:
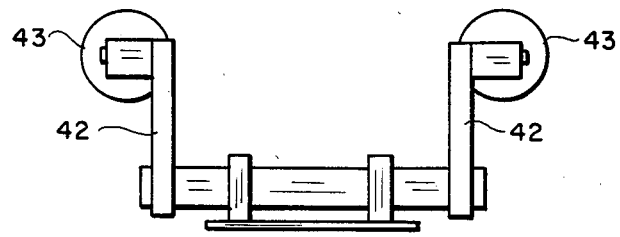
FIG. 7 is a front view of the traveling arm and suction rings shown in FIG. 6.

Between these sets of free rollers 34 and 36 is a pair of continuous tracks or chains 40 for a traveling arm 42. As seen in FIGS. 6 and 7 which show a modified form of traveling arm 42', vacuum pump suction rings 43 are mounted on the traveling arm 42'. The operation of the traveling arm 42' is remotely controlled. As will be seen, when contact between the traveling arm and the desired container or tote bin has been detected, a vacuum pump (not shown) connected to the rings 43 will be switched on. A tote bin that is positioned on the free-floating rollers 34 and 36 can be moved onto either of the roller shuttles 24 and 26 through sets of chain conveyors 44 and 46. When not in use, the chain conveyors are positioned slightly below the plane of the rollers on the carriage as best seen in FIG. 4. Upon command, the chain conveyors 44 and 46 are raised slightly through use of inflatable rubber bladders 48 and 50 located beneath the conveyors.

The system includes at least one storage carousel; however, in the preferred embodiment, the storage and retrieval system would include at least two independently operating carousels 14 and 16, mounted one above the other. It is important to note that two independently operating carousels aligned with a single elevator can greatly expedite the working of the system. One carousel could be moving to bring one desired bin to the elevator while the other carousel could be moving to bring another desired bin to the elevator. Thus, as will be seen, the system can accomplish two transactions with each vertical cycle of the carriage.

The structure of each carousel includes a top track 52 and a bottom track 54. The tracks for each carousel would be parallel and identical, oval-like in shape with rounded ends and parallel sides as can be seen in FIG. 2. The elevator 12 is aligned adjacent to one of the rounded ends of the carousels.

Each carousel includes a series of compartmented baskets 56, that move along the oval tracks. The baskets 56 are parallel to each other and would be generally perpendicular to the carriage roller sets. The baskets would be lightweight in construction, consisting of wire caging for instance. When in storage, the tote bins 11 would rest in the various compartment levels 58 of the baskets. The tote bins when in storage might protrude slightly from the baskets. The baskets would be moved on the tracks by an electrically or hydraulically operated motor 60 located on the top track. The baskets in any one carousel would operate independently of the baskets in any other carousel.

The system is multi-faceted and can be made to perform a variety of work chores. The system may be used for "kitting" whereby a series of parts are delivered to a waist-high station to be assembled.

Under normal operating conditions, one tote bin will be taken from storage and another will be returned to storage during each vertical cycle of the carriage 18. The entire operation of the system is controlled from a remote digital keyboard operator's terminal (not shown). This computer terminal operates in conjunction with a remote laser scanner (not shown) which is capable of detecting bar codes 61 entered on the outside of the tote bins 11. The code number of the tote bin that is desired to be removed from storage is entered into the terminal. Upon receiving the appropriate command from the operator's terminal, the baskets 56 of one carousel will be moved around the carousel tracks until the appropriate basket is aligned facing the elevator 12. Meanwhile, the carriage will be moved up from the waist-high work station or conveyor 22. When the carriage has been elevated to the correct height, it will stop, and the traveling arm will move from its resting place until it comes in contact with the desired tote bin. The desired tote bin will be extracted using the vacuum pump suction rings 43 on the traveling arm 42. The computer memory in the operator's terminal remembers where each tote bin is in the system and will retrieve the desired coded bin upon command. Finally, the tote bin will be moved from the free rollers 34 and 36 to the outgoing shuttle 26 through use of the chain conveyor 46.

After a desired bin has been extracted, another tote bin that has been brought from the work station or conveyor to be placed in storage can be moved from the incoming roller shuttle 24 to the free rollers 34 and 36. The baskets 56 will be moved around the tracks and the carriage 18 will simultaneously move vertically in order to locate an empty compartment. The traveling arm 42 will then move the tote bin from the free rollers 34 and 36 into the empty compartment. The placement of tote bins in the compartment levels is randomly done. The computer memory will "remember" where the tote bin has been stored in the system.

An advantage of the present invention lies in the improved inventory control that is built into the system. The computer at all times retains an automatic record of the tote bins in the system.

If parts were stored in different size tote bins, the system could be programmed to deliver different size bins to different sized compartments in the baskets.

An alternative embodiment of the invention is shown in FIG. 5. A first elevator 62, operating independently of a second elevators 64, would be positioned at the opposite rounded ends of three parallel carousels. The first elevator 62 could operate to insert bins into the carousels while the second elevators 64 could operate to extract desired bins from the carousels. Independent operation of the elevators 62 and 64 would further increase the speed capabilities of the invention.

The conveyor 66 that feeds the inserter elevators would have a queue area 68 which allows incoming tote bins to line up to be inserted in any particular carousel. This would prevent the conveyor system 66 that feeds the elevators 62 from being backed-up in the event that more than one tote bin is to be inserted in the same carousel.

Whereas the present invention has been described in particular relation to the drawings attached hereto it should be understood that other further modifications of the invention, apart from those shown or suggested herein, may be made within the spirit and scope of the invention.

What is claimed is:

1. An automatic article storage and retrieval apparatus which comprises a continuous track; continuous article storage means supported from said track and movable therearound in a horizontal direction; a plurality of horizontally spaced and vertically extending baskets located on said article storage means, each basket having vertically spaced compartments formed to accept a container; means for driving said article storage means around said track; an elevator mounted in a fixed position adjacent the outside of said track; a carriage mounted in said elevator for vertical movement up and down adjacent said track; a horizontally movable container engaging means mounted on said carriage for movement towards and away from said baskets for placement of one of said containers in and withdrawal of one of said containers from a preselected compartment; said horizontally movable container engaging means including a traveling arm mounted on a pair of tracks located in said carriage below said traveling arm, said pair of tracks being substantially parallel with the direction of movement of said traveling arm; and means for moving said container engaging means to a predetermined vertical location adjacent the preselected compartment; said means for driving said article storage means being adapted to move said article storage means a predetermined amount in a horizontal plane to align the preselected compartment with said container engaging means; whereby containers are automatically inserted into and withdrawn from preselected compartments responsive to commands from an external source.

2. An article storage and retrieval apparatus as set forth in claim 1 wherein said traveling arm and said pair of tracks are centrally located with respect to said carriage, wherein a first plurality of spaced driven rollers are located on one side of said carriage and on one side of said traveling arm and wherein a second plurality of spaced driven rollers are located on a side of said carriage opposite from said one side thereof and on a side of said traveling arm opposite from said one side thereof for feeding containers onto and off said carriage, the rotational axis of said driven rollers being transverse with respect to the movement of said traveling arm.

3. An article storage and retrieval apparatus as set forth in claim 2 wherein a first plurality of spaced and freely rotatable rollers are located on said carriage between said pair of tracks and said first plurality of driven rollers and wherein a second plurality of spaced and freely rotatable rollers are located on said carriage between said pair of tracks and said second plurality of driven rollers for supporting one of said containers in the central portion of said carriage, said freely rotatable rollers being in axial alignment with the rollers of said first and second pluralities of spaced driven rollers.

4. An article storage and retrieval apparatus as set forth in claim 2 wherein said carriage includes a plurality of chain conveyors extending transverse to the direction of movement of said traveling arm in the spaces between the axially aligned driven and freely rotatable rollers and on both sides of said traveling arm, said chain conveyors, when not in use, being positioned slightly below an upper plane formed by the uppermost portions of all of said rollers, and means for raising the chain conveyors for moving a container disposed on the freely rotatable rollers onto either plurality of driven rollers.

5. An article storage and retrieval apparatus as set forth in claim 1 wherein a suction means is mounted on said traveling arm for engaging a container in a preselected compartment for withdrawing it therefrom.

6. An article storage and retrieval apparatus as set forth in claim 1 including a second continuous track identical to the first-mentioned continuous track and located above and parallel to said first continuous track, a second continuous article storage means identical to the first-mentioned continuous article storage means supported from said second track above said first track and movable in a horizontal direction around said second track; a second plurality of horizontally spaced and vertically extending baskets identical to the first-mentioned plurality of horizontally spaced and vertically extending baskets located on said second continuous article storage means, each basket of said second plurality of baskets having vertically spaced compartments formed to accept a container; said second continuous article storage means being movable independently of said first article storage means.

7. An automatic article storage and retrieval apparatus as set forth in claim 1 including an additional elevator mounted in another fixed position adjacent the outside of said track; a carriage mounted in said additional elevator for vertical movement up and down adjacent said track; a horizontally movable container engaging means mounted on said carriage for movement towards and away from said baskets for placement of one of said containers in and withdrawal of one of said containers from a preselected compartment; and means for moving said container engaging means to a predetermined vertical location adjacent the preselected compartment.

8. An automatic article storage and retrieval apparatus which comprises a continuous track; continuous article storage means supported from said track and movable therearound in a horizontal direction; a plurality of horizontally spaced and vertically extending baskets located on said article storage means, each basket having vertically spaced compartments formed to accept a container; means for driving said article storage means around said track; an elevator mounted in a fixed position adjacent the outside of said track; a carriage mounted in said elevator for vertical movement up and down adjacent said track; a horizontally movable container engaging means mounted on said carriage for movement towards and away from said baskets for placement of one of said containers in and withdrawal of one of said containers from a preselected compartment; and means for moving said container engaging means to a predetermined vertical location adjacent the preselected compartment; said means for driving said article storage means being adapted to move said article storage means a predetermined amount in a horizontal plane to align the preselected compartment with said container engaging means; whereby containers are automatically inserted into and withdrawn from preselected compartments responsive to commands from an external source.

9. An article storage and retrieval apparatus as set forth in claim 8 wherein said horizontally movable container engaging means includes a travelling arm mounted on a pair of tracks located in said carriage below said travelling arm, said pair of tracks being substantially parallel with the direction of movement of said travelling arm.

10. An article storage and retrieval apparatus as set forth in claim 8 wherein said traveling arm and said pair of tracks are centrally located with respect to said carriage, wherein a first plurality of spaced driven rollers are located on one side of said carriage and on one side of said traveling arm and wherein a second plurality of spaced driven rollers are located on a side of said carriage opposite from said one side thereof and on a side of said traveling arm opposite from said one side thereof for feeding containers onto and off said carriage, the rotational axis of said driven rollers being transverse with respect to the movement of said traveling arm.

11. An article storage and retrieval apparatus as set forth in claim 10 wherein a first plurality of spaced and freely rotatable rollers are located on said carriage between said pair of tracks and said first plurality of driven rollers, and wherein a second plurality of spaced and freely rotatable rollers are located on said carriage between said pair of tracks and said second plurality of driven rollers for supporting one of said containers in the central portion of said carriage, and freely rotatable rollers being in axial alignment with the rollers of said first and second pluralities of spaced driven rollers.

12. An article storage and retrieval apparatus as set forth in claim 11 wherein said carriage includes a plurality of chain conveyors extending transverse to the direction of movement of said traveling arm in the spaces between the axially aligned driven and freely rotatable rollers and on both sides of said traveling arm, said chain conveyors, when not in use, being positioned slightly below an upper plane formed by the uppermost portions of all of said rollers, and means for raising the chain conveyors for moving one of said containers disposed on the freely rotatable rollers onto either plurality of driven rollers.

13. An article storage and retrieval apparatus as set forth in claim 8 wherein a suction means is mounted on said traveling arm for engaging a container in a preselected compartment for withdrawing it therefrom.

14. An article storage and retrieval apparatus as set forth in claim 8 including a second continuous track identical to the first-mentioned continuous track and located above and parallel to said first continuous track, a second continuous article storage means identical to the first-mentioned continuous article storage means supported from said second track above said first track and movable in a horizontal direction around said second track; a second plurality of horizontally spaced and vertically extending baskets identical to the first-mentioned plurality of horizontally spaced and vertically extending baskets located on said second continuous article storage means, each basket of said second plurality of baskets having vertically spaced compartments formed to accept a container; said second continuous article storage means being movable independently of said first article storage means.

15. An article storage and retrieval apparatus as set forth in claim 8 including an additional elevator mounted in another fixed position adjacent the outside of said track; a carriage mounted in said additional elevator for vertical movement up and down adjacent said track; a horizontally movable container engaging means mounted on said carriage for movement towards and away from said baskets for placement of one of said containers in and withdrawal of one of said containers from a preselected compartment; and means for moving said container engaging means to a predetermined vertical location adjacent the preselected compartment.

* * * * *